United States Patent
Caviglia et al.

(10) Patent No.: US 9,565,055 B2
(45) Date of Patent: *Feb. 7, 2017

(54) PROTECTION AGAINST THE EFFECT OF EQUIPMENT FAILURE IN A COMMUNICATION SYSTEM

(71) Applicant: Ericsson AB, Stockholm (SE)

(72) Inventors: Diego Caviglia, Savona (IT); Francesco Lazzeri, Chiavari (IT); Giovanni Fiaschi, Genoa (IT); Mario Molinari, Genoa (IT)

(73) Assignee: Ericsson AB, Stockholm (SE)

( * ) Notice: Subject to any disclaimer, the term of this patent is extended or adjusted under 35 U.S.C. 154(b) by 262 days.

This patent is subject to a terminal disclaimer.

(21) Appl. No.: 14/506,869

(22) Filed: Oct. 6, 2014

(65) Prior Publication Data

US 2015/0023157 A1 Jan. 22, 2015

Related U.S. Application Data

(63) Continuation of application No. 12/781,233, filed on May 17, 2010, now Pat. No. 8,886,832, and a
(Continued)

(51) Int. Cl.
*H04L 12/703* (2013.01)
*H04L 12/24* (2006.01)
(Continued)

(52) U.S. Cl.
CPC ....... *H04L 41/0668* (2013.01); *H04L 41/0677* (2013.01); *H04L 45/00* (2013.01);
(Continued)

(58) Field of Classification Search
CPC ............. H04L 1/22; H04L 45/22; H04L 45/28
See application file for complete search history.

(56) References Cited

U.S. PATENT DOCUMENTS

| 6,327,669 | B1 | 12/2001 | Croslin |
| 6,542,934 | B1 * | 4/2003 | Bader ................. G06F 11/2007 709/237 |

(Continued)

FOREIGN PATENT DOCUMENTS

| EP | 1168714 | 5/2009 |
| WO | 0129682 | 4/2001 |

(Continued)

OTHER PUBLICATIONS

Fast Reroute Extensions to RSVP-TE for LSP Tunnels, Network Working Group, Internet Draft, Ping Pan et al., pp. 1-33, Oct. 2001.
(Continued)

*Primary Examiner* — Jeong S Park
(74) *Attorney, Agent, or Firm* — Kirschstein, Israel, Schiffmiller & Pieroni, P.C.

(57) ABSTRACT

A data communications system has a plurality of nodes connected by a plurality of links. A subset of the links and nodes forms a worker path for carrying worker data through the communications system, and a further subset of links and nodes provides a protection path for carrying other data in the absence of a fault in the worker path and for providing an alternative path for the worker data in the event of a fault in the worker path. The alternative path is predetermined prior to the detection of a fault in the worker path.

16 Claims, 5 Drawing Sheets

— Worker
- - - Detours

<L : fault towards Destination
L> : fault towards Source
P> : SNCP fork to Source
<P : SNCP fork to Destination

Related U.S. Application Data continuation of application No. 10/531,188, filed as application No. PCT/IB03/05516 on Oct. 14, 2003, now Pat. No. 7,747,773.

(51) Int. Cl.
*H04L 12/701* (2013.01)
*H04L 12/707* (2013.01)
*H04L 29/14* (2006.01)

(52) U.S. Cl.
CPC .............. *H04L 45/22* (2013.01); *H04L 45/28* (2013.01); *H04L 69/40* (2013.01); *H04J 2203/006* (2013.01)

(56) References Cited

U.S. PATENT DOCUMENTS

| | | | | |
|---|---|---|---|---|
| 6,895,441 | B1* | 5/2005 | Shabtay | H04L 45/00 340/2.1 |
| 7,747,773 | B2* | 6/2010 | Caviglia | H04L 41/0677 370/216 |
| 8,886,832 | B2* | 11/2014 | Caviglia | H04L 41/0677 370/216 |
| 2002/0003639 | A1 | 1/2002 | Arecco | |
| 2002/0004843 | A1* | 1/2002 | Andersson | H04L 45/00 709/238 |
| 2002/0067693 | A1 | 6/2002 | Kodialam | |
| 2002/0078232 | A1 | 6/2002 | Simpson | |
| 2002/0172149 | A1 | 11/2002 | Kinoshita | |
| 2002/0172150 | A1* | 11/2002 | Kano | H04J 3/085 370/216 |
| 2003/0063613 | A1* | 4/2003 | Carpini | H04L 45/02 370/401 |
| 2004/0218525 | A1* | 11/2004 | Elie-Dit-Cosaque | H04L 41/0631 370/223 |
| 2005/0122908 | A1* | 6/2005 | Soumiya | H04J 14/0227 370/241 |
| 2005/0276217 | A1* | 12/2005 | Gadgil | H04L 45/28 370/225 |
| 2006/0002292 | A1* | 1/2006 | Chang | H04L 12/462 370/225 |

FOREIGN PATENT DOCUMENTS

| | | |
|---|---|---|
| WO | 02009349 | 1/2002 |
| WO | 03030462 | 4/2003 |

OTHER PUBLICATIONS

Fast Reroute Techniques in RSVP-TE, ver. 00, Oct. 2001, http://tools.ietf.org/html/draft-ping-rsvp-fastreroute-00.txt, pp. 1-27, Ed. Ping Pan, et al.

International Search Report, International application No. PCT/IB03/05516, Jun. 29, 2004.

* cited by examiner

Worker ———
Detour 10 — · — · —
Detour 12 ············
Detour 14 — — —

Worker
— — Detours

Worker
— — Detours

— Worker
— — Detours

<L : fault towards Destination
L> : fault towards Source
P> : SNCP fork to Source
<P : SNCP fork to Destination

PROTECTION AGAINST THE EFFECT OF EQUIPMENT FAILURE IN A COMMUNICATION SYSTEM

CROSS REFERENCE TO RELATED APPLICATIONS

This application is a continuation of U.S. patent application Ser. No. 12/781,233, filed May 17, 2010, now allowed, which, in turn, is a continuation of U.S. patent application Ser. No. 10/531,188, filed Apr. 12, 2005, now U.S. Pat. No. 7,747,773, issued Jun. 29, 2010, which is a U.S. national stage application of international application number PCT/IB2003/005516, filed Oct. 14, 2003.

The present invention relates to the field of communications systems in general and to systems for protecting against the effects of equipment failure in communications systems in particular.

One of the most important concepts in network management is maintaining the survivability of networks. When there are either link or node failures any affected routes should be repaired as soon as possible. A node failure can be considered as the failure of multiple links, that is, a node failure affects the traffic the same way as if all links terminated on it were faulty. The present invention applies to both link and node diversity protection schemes: here diversity relates to the property of the resources used by the protection path (links and/or nodes) to be fully disjoint from those used by the working path.

Because of the large volumes of traffic that networks are expected to carry, resulting from the continued explosive growth of data-oriented applications, network survivability has become an issue of paramount importance. In conjunction, there is a continuing drive for maximising efficiency and minimising costs in large networks. Nodes are able to monitor the status of the connections passing through them to detect faults. In the SDH transport network, for example, this can be achieved using both trail monitoring and the so-called non-intrusive monitoring, both defined in the ITU-T specification G.783.

Traditional protection schemes, mainly used in ring networks, consume large amounts of bandwidth. Shared protection (where resources are shared between a number of protection paths) on mesh networks requires less additional capacity to provide fault protection than on ring networks. Although shared protection mesh networks consume fewer network resources, the trade-off has been in longer service restoration times. There is therefore a need for an appropriate architecture to enable fast restoration in such networks.

The present invention provides a data communications system comprising a plurality of nodes and a plurality of links for providing connections between the nodes; in which a subset of the links and nodes form a worker path for carrying worker data through the communication system; in which the system comprises a further subset of links and nodes for forming a plurality of protection paths for carrying non-worker data in the absence of a fault in the worker path and each for providing an alternative path for the worker data in a different part of the worker path in the event of a fault in the worker path; in which the system comprises protection means, in which the alternative paths are predetermined by the protection means prior to the detection of a fault in the worker path; in which the protection means is arranged to activate the entire plurality of protection paths to carry the worker data upon detection of a fault in the worker path; in which the protection means is arranged to identify the location of the fault, to return the worker data to those parts of the worker path not affected by the fault and to de-activate any of the protection paths providing an alternative to those parts of the worker not affected by the fault.

According to a preferred embodiment, the system comprises means for allocating the links and nodes one or more cost values relative to the links and nodes of the worker path and means for selecting on the basis of the one or more cost values a further subset of the nodes and links to form a protection path for at least one link or node of the worker path The present invention also provides a method of protecting a worker path in a data communications system comprising a plurality of nodes and a plurality of links for providing connections between the nodes; including the steps of passing worker data through a subset of the links and nodes making up the worker path and designating a further subset of links and nodes to form a plurality of protection paths; in which the protection paths carry no worker data in the absence of a fault in the worker path and in which each provides an alternative path for the worker data in a different part of the worker path in the event of a fault in the worker path; including the steps of detecting a fault in the worker path and activating the entire plurality of protection paths to carry the worker data upon detection of a fault in the worker path; including the steps of identifying the location of the fault and returning the worker data to those parts of the worker path not affected by the fault and de-activating any of the protection paths that are providing an alternative for those parts of the worker path not affected by the fault.

According to a preferred embodiment, the present invention also provides a method including the steps of allocating the links and nodes one or more cost values relative to the links and nodes of the worker path and selecting on the basis of the one or more cost values a further subset of the nodes and links to form a protection path for at least one link or node of the worker path.

Embodiments of the invention will now be described by way of example with reference to the drawings in which FIGS. 1 to 3 show conventional operation with protection switching inside a transport network element (TNE);

The invention will be explained by way of example with reference to SONET/SDH transport networks due to the great popularity of this kind of network, however the present invention is not limited to such networks. In conventional SONET/SDH networks, one can recover from a faulty link or node in 50 ms or less, but achievement of this depends on optical network links having a 1+1 backup, i.e. with one backup link allocated for every worker link. To avoid this waste of resources, the present invention provides a shared restoration mechanism that provides enhanced network survivability while minimising the network resources consumed.

The following table summarises four possible protection schemes with respect to path calculation (i.e. calculation of the sequence of links and nodes to be traversed), resource selection (i.e. selection of the channels to be used within the links) and resource allocation (i.e. the actual implementation of cross connections in the nodes, and consequent seizure of the channels in the links).

| Protection Scheme Type | Path Calculation | Resource Selection | Resource Allocation |
| --- | --- | --- | --- |
| 1 | After Failure | After Failure | After Failure |
| 2 | Before Failure | After Failure | After Failure |
| 3 | Before Failure | Before Failure | After Failure |
| 4 | Before Failure | Before Failure | Before Failure |

The present invention relates to protection scheme type three of the table while conventional SDH protection (APS or Automatic Protection Switching) is type four.

Type three resources are only used after a fault occurs. The same resource can be allocated to several restoration paths, provided that these restoration paths are never activated simultaneously by a single fault. Sharing resources between different restoration paths in this way is the definition of "shared restoration" for this invention.

SNCP Operations in a Transport Network Element (TNE)

Figure 1:
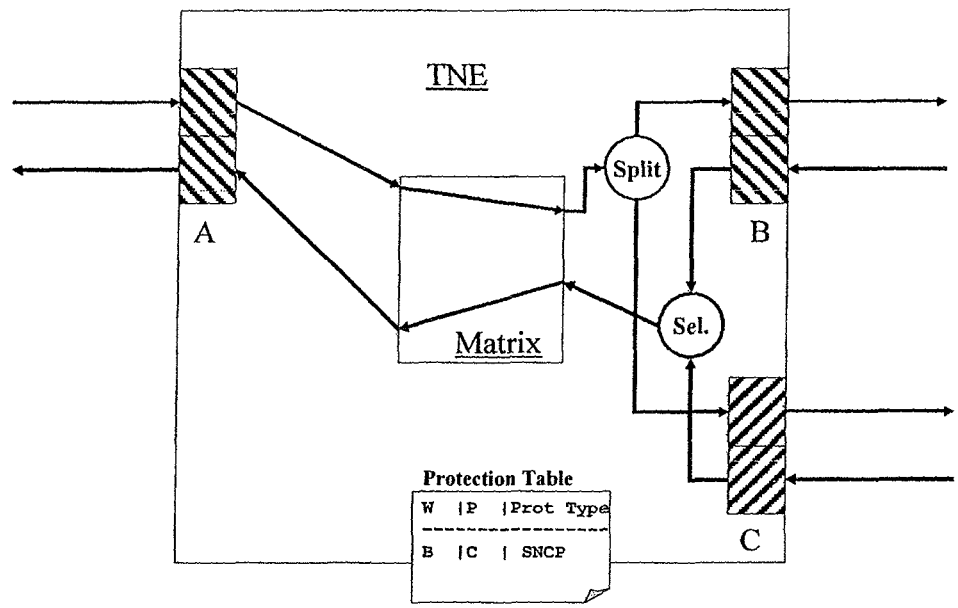
Figure 2:
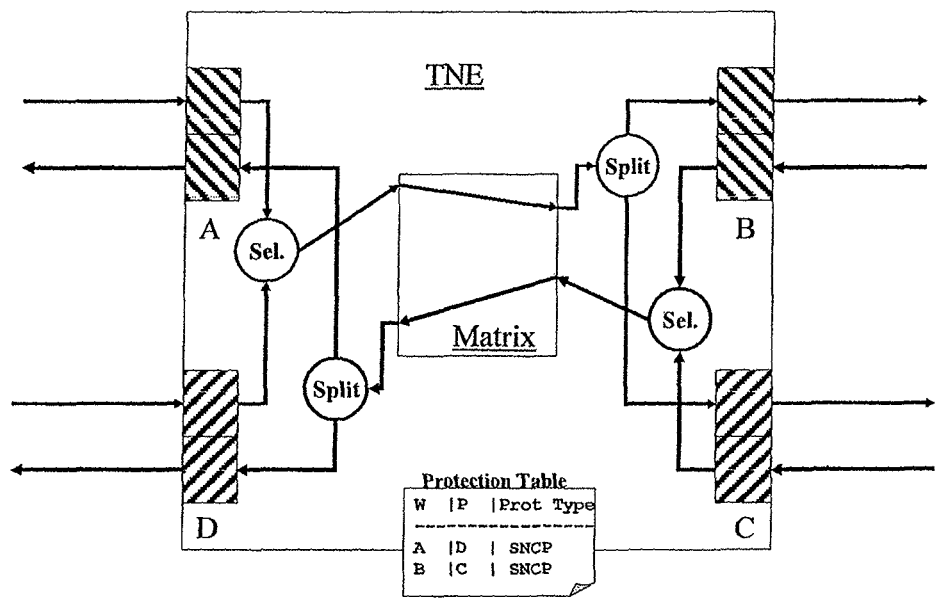
Figure 3:
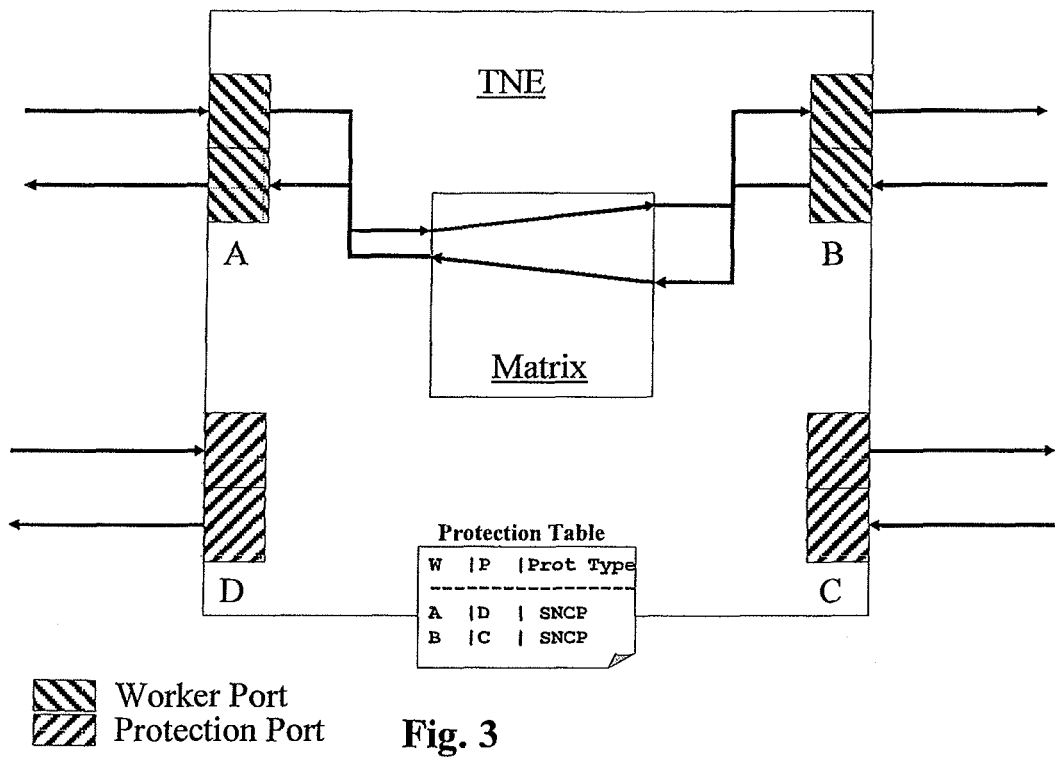

The cross-connection mechanism needed in a node in order to switch, in a non traffic-affecting way, between the worker and protection path and vice-versa will now be illustrated, with reference to FIGS. 1 to 3. As stated above, we adopt, by way of example, the SDH nomenclature, but the same conceptual mechanism can be used in all transport network architectures.

FIG. 1 illustrates how a single sub-network connection protection (SNCP) protection scheme is implemented, as defined in ITU-T rec. 0.805 sec. 7.2.2. Worker ports A and B exchange data via the switch matrix of the TNE. Protection port C is protecting worker port B: if a failure occurs affecting port B, the pre-planned protection starts using port C. Protection uses a split function and a select function within the TNE. The selection module (Sel.) selects the best signal between the two it receives (i.e. one from each of ports B and C) and sends the selected signal to port A via the matrix. The split module splits the signal it receives from port A via the matrix into two signals one sent to each of ports B and C. Worker port A has no corresponding protection port a failure affecting part A will adversely affect communications. The relevant information, relating to both the worker (W) and the protection (P) paths, needed in order to perform protection switching, should the need arise is stored in a protection table. The table may be provided in any implementation of a control unit for the TNE.

FIG. 2, shows a TNE similar to that of FIG. 1, with the addition of protection port D. According to FIG. 2, worker port A is protected by a SNCP, via protection port D while worker port B is protected by a SNCP via protection port C. An additional selection function (Sel.) selects the best signal between the two it receives from ports A and D and sends it to the "B side" split function via the matrix. An additional split function splits the signal it receives from the "B side" select function via the matrix in two, sending one to each of ports A and D. This behaviour assures that, in case of a failure of one or more resources of the worker path, the traffic is correctly transported by corresponding resources of the protection path. Moreover, it is possible, when the worker path becomes available again, to disable the protection path and revert to the worker path without adversely affecting the transported traffic. A protection table contains the relevant information needed in order to perform protection switching for either port A or B, should the need arise.

FIG. 3 depicts how a TNE works in the absence of failures. The TNE of FIG. 3 has two worker ports (A, B) and two protection ports (D, C). As the figure shows, during normal operation no protection scheme is implemented. Worker traffic passes bi-directionally between worker ports A and B via a switch matrix internal to the TNE. A protection table contains the relevant information needed in order to perform protection switching, should the need arise. Activation of the protection table will cause implementation of a double protection scheme as shown in FIG. 2.

A typical communications network comprises one or more worker paths that cross a set of resources in the network, namely nodes (e.g. TNEs) and links. If only faults occurring among links are considered, the protection is defined as "protection with link diversity". If faulty nodes are considered in addition to links, the protection is defined as "protection with node diversity".

According to the present invention, a preplanned local repair scheme may be configured, activated and deactivated according to the following sequence:

1. when the worker path is configured, a set of detours is also computed whose union can bypass all the resources (with either link or node diversity) in the worker path. For shared restoration, details of alternative paths (i.e. the links and nodes used for the detours) are stored for possible future use in the event of a failure but not implemented immediately. Detours must be selected with specific criteria to allow efficient sharing of the protection resources: see "Selecting and Configuring Detours", below. The alternative paths are not used for carrying the worker data unless a fault has been detected in the worker path.

2. When a failure occurs, locating exactly which resource(s) (link or node) is faulty in the worker path may take a long time, but the source and destination nodes and, possibly, a set of intermediate nodes can very quickly detect that the worker path is faulty somewhere: see "Designating Monitoring Points", below.

3. As the presence of a fault is detected but not located, all the detours are activated at once using SNCP to simultaneously activate multiple detours: see "Activating Detours", below. This achieves the necessary protection in the shortest recovery time.

4. Later, when the fault is fully located by the nodes, only the detour that actually bypasses the faulty resource is left in place: see "Selecting the Protecting Detours", below. If two detours protect the same faulty resource they are both activated, and it is simplest to allow them to remain activated until the fault is fixed, although, one could be deactivated.

5. All the other detours are released, i.e. a hitless partial deactivate is performed: see "Reactivating the Unused Detours" below.

6. When the fault is repaired, the last detour is also released.

Selecting and Configuring Detours

When a path with pre-planned protection is requested, a worker path and a set of protection detours are computed. The worker path may typically be computed by means of a shortest path algorithm according to conventional techniques.

For each resource (link or node) forming part of the worker path, there must exist at least one detour to accommodate a fault on that resource. Each detour will preferably use as few resources as possible.

Figure 4:
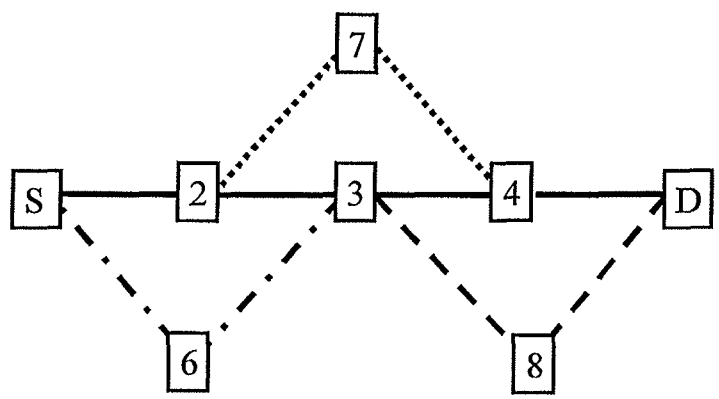
FIGS. 4 to 7 show a network of TNEs illustrating various protection mechanisms according to the present invention.

As indicated above, it may happen that two detours protect the same resource. This is unavoidable if node diversity is required, because, if two adjacent nodes are protected by different detours, then the link between them will be protected by both these detours. This is illustrated in FIG. 4. According to the embodiment of FIG. 4, the worker path extends from source node S to destination node D through nodes 2, 3 and 4. The network of FIG. 4 also has three detour paths: detour 10 extends between nodes S, 6 and 3; detour 12 extends between nodes 2, 7 and 4 and detour 14 extends between nodes 3, 8 and D. Source node S and destination node D perform trail monitoring. For example nodes 2 and 3 on the worker path are protected by separate detours. (Node 2 is protected by detour 10 and node 3 by detour 12. As a result, the link between nodes 2 and 3 is protected by both detours 10 and 12). It will be noted that the three detours (10, 12 and 14) of FIG. 4 provide a number of disjoint (i.e. not directly connected) alternatives to the worker path. However, for simplicity, such a combination of detours will be referred to here as a single alternative path. This is valid as it is only the combination of all these detours that offer protection for every resource of the worker path.

Two kinds of nodes take part in a detour: nodes that terminate the detour (TD), (i.e. those that are also crossed by the worker path), and nodes that are intermediate in the detour (ID). An ID node stores information defining the cross-connection required for the detour without implementing it unless a fault is detected in a resource of the worker path protected by that ID node, as described below. The ID node may also associate a unique path identifier with the cross-connection definition, in order to allow it to be identified when activation of the detour is requested (see below).

In normal, fault-free operation, a TD node implements the "worker" cross-connection that forms part of the worker path. The TD node stores information defining a "detour" cross-connection i.e. a "fork" in the path that would transfer traffic from the worker path to the detour, i.e. the protection path.

Designating Monitoring Points

Figure 5:
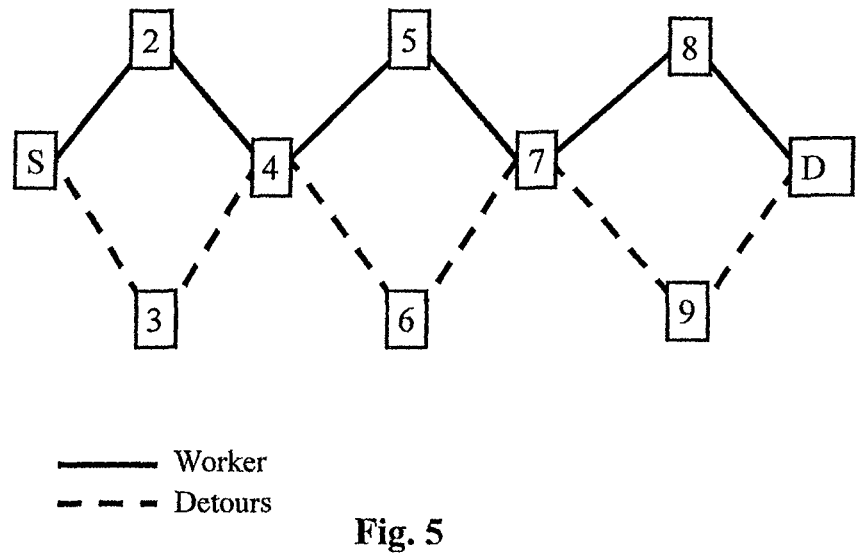
Figure 6:
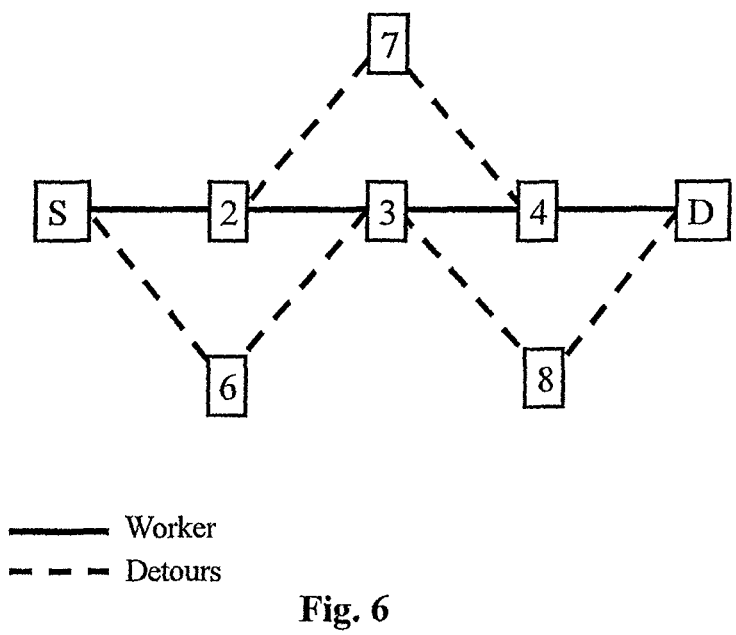

The speed at which detours are activated is improved according to a preferred embodiment by sending the ActivateDetour message from both the beginning and end of each detour rather than from just one end (the ActivateDetour message contains the unique path identifier for the cross-connection definition). This reduces the time required for signaling to the propagation delay across half of the longest detour. The signaling will start at a monitoring TD node when that node detects a failure in the worker circuit. For these reasons, placing non-intrusive monitoring functions at all TD nodes is recommended. Examples are given in the drawings where FIG. 5 shows an example in which not all nodes in the worker path implement monitoring points (i.e. only nodes 4 and 7, see below) and FIG. 6 shows an example in which all nodes in the worker path implement monitoring points According to the embodiment of FIG. 5, the worker path extends from source node S to destination node D through nodes 2, 4, 5, 7 and 8. The network of FIG. 5 also has three detour paths that extend, respectively between nodes S, 3 and 4; 4, 6 and 7 and 7, 9 and D. Source node S and destination node D perform trail monitoring. Only nodes 4 and 7 perform non-intrusive monitoring. According to the embodiment of FIG. 6, the worker path extends from source node S to destination node D through nodes S, 2, 3, 4, and D. The network of FIG. 6 also has three detour paths that extend, respectively between nodes S, 6 and 3; 2, 7 and 4; and 3, 8 and D. Source node S and destination node D perform trail monitoring. Nodes 2, 3 and 4 perform non-intrusive monitoring Activating Detours When the (TD) nodes implementing monitoring detect a worker path failure, they all send an ActivateDetour message through the detour paths. The ActivateDetour message contains a unique path identifier to inform the ID nodes which detour connections must be activated. The ActivateDetour message actually identifies to the ID nodes which parts of the detour path to activate (i.e. by use of the unique path identifier for the cross-connection definition referred to above under "Selecting and Configuring Detours"). We may think of a working path and all its associated detours as a single object with a unique identifier, if any node receives an ActivateDetour message with a certain identifier, it activates the connections implementing the detours associated the that identifier. This includes the TD nodes implementing the appropriate detour cross-connections (SNCP forks).

The ID nodes, in turn, propagate a received ActivateDetour message unless they have already received it, (i.e. form the TD node at the other end of the detour connection) and implement the previously defined cross-connection corresponding to the unique path identifier in the message.

If a node is trying to propagate an ActivateDetour message to a faulty resource (i.e., a link identified as faulty by a disabling alarm: a faulty node is perceived as a faulty link by its neighbouring node), the cross-connection through the node leading to the faulty resource is deleted locally and autonomously by the node itself and a DeleteDetour message is generated by the node to recover that unusable detour (see "De-activate the unused detours", below).

Selecting the Protecting Detours

A single fault on a specific resource will be protected by one or more detours. It is possible that further detours are present in the network that are not protecting the faulty resource and can therefore be released, i.e. all the detours are implemented at first and then some deactivated. When the faulty, resource is identified and its location determined (e.g. by node diagnostics), it is possible to identify which detours are protecting the faulty resource and which ones not. The latter can then be released to allow them to carry other traffic and to protect other faults, if any, thus enhancing network resilience. This can be viewed as an early partial-deactivate: i.e. the de-activation of some detours before the fault is repaired.

Figure 7:
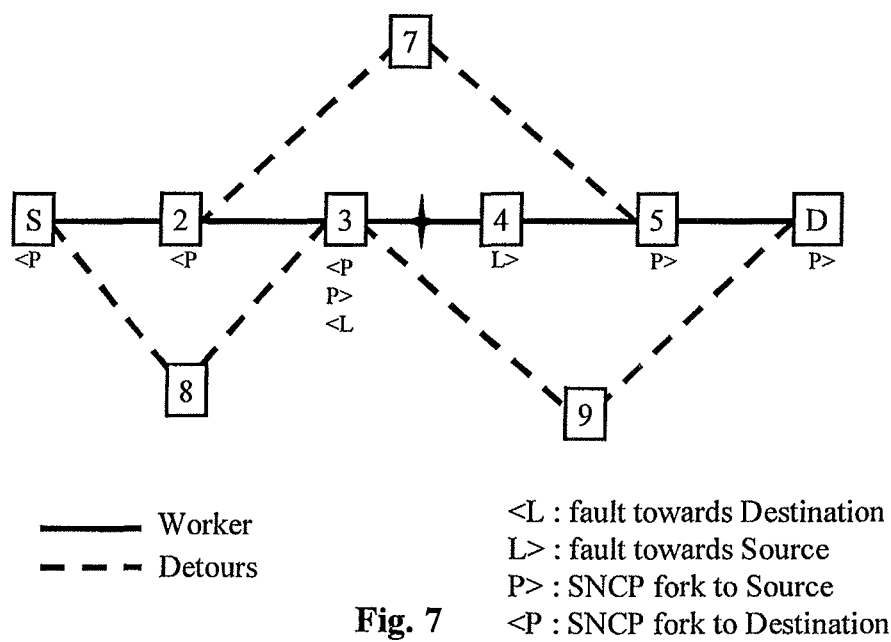

The identification of non-protecting detours will now be described with reference to FIG. 7. FIG. 7 shows a network with overlapping detours similar to that of FIG. 6. According to the embodiment of FIG. 7, the worker path extends from source node S to destination node D through nodes 2, 3, 4 and 5. The network of FIG. 7 also has three detour paths that extend, respectively between nodes S, 8 and 3; 2, 7 and 5; and 3, 9 and D. The network of FIG. 7 has a faulty resource (see spike symbol) i.e. the link between TD nodes 3 and 4 on the worker path. The two detour paths crossing nodes 7 and 9 are both protecting the faulty resource, while the detour crossing nodes 8 is not and can therefore be released. To locate the non-protecting detours the following algorithm is used:

(1) indicate with <L and L> the nodes where the alarm of the faulty resource has been detected as follows: indicate nodes where a fault has been detected towards the destination with <L and nodes where a fault has been detected towards the source of the worker path with L>. <L and L> may be thought of as status fields within the nodes.

(2) indicate with <P nodes where a detour begins in the direction of the destination. Indicate with P> nodes where a detour begins in the direction of the source (<P and P> are only present in TD nodes). <P and P> may also be thought of as status fields within the nodes. <P, P>, <L and L> are not mutually exclusive: see FIG. 7.

Hence, in the embodiment of FIG. 7, the TD nodes have the following status:

$$S = <P;$$
$$2 = <P;$$
$$3 = <P\ P> <L;$$
$$4 = L>;$$
$$5 = P>;$$
$$D = P>.$$

According to the embodiment of FIG. 7, only nodes 3 & 4 detect the fault, although in practice more of the TD nodes could do this.

(3) nodes with <L send a RevertSource message along the worker path in the direction away from the faulty resource, i.e. towards the source node.

(4) if a node with a <P receives the RevertSource message, the message is propagated along the worker path and no action is taken. It is possible for the same node to be indicated with both <P and <L. If so, the algorithm works as if there were a message passed between a first node with <L and a second node with <P, although, in practice, there is no need of a message (5) if a node indicated by a P> receives the RevertSource message, the message is propagated along the worker path and the detour is recovered as described below. It is possible for the same node to be indicated with both P> and <L. If so, the algorithm acts as if a message is passed from <L to P> in a similar way to the case described at step (3), above for <P and <L, (6) the node with L> sends a RevertDestination message along the worker path in the direction away from the faulty resource, i.e. towards the Destination node.

(7) if a node indicated by P> receives the RevertDestination message, the message is propagated along the worker path and no action is taken. It is possible for the same node to be indicated with both P> and L>. If so, the algorithm acts as if a message is passed from L> to P> in a similar way to the case described at step (3), above for <P and <L, (8) if a node indicated by <P receives the RevertDestination message, the message is propagated along the worker path and the detour is recovered as described below. It is possible for the same node to be indicated with both <P and L>. If so, the algorithm acts as if a message is passed from L> to <P in a similar way to the case described at step (3), above for <P and <L.

Turning to the embodiment of FIG. 7, a RevertDestination message is sent from node 4 (L>) and propagated through node 5 (P>) to destination node D (P>): nothing is done, because the message crosses only nodes with P> representing protecting detours.

Simultaneously, in FIG. 7, a RevertSource message is sent from node 3 (<P, P> and <L) and propagated through node 2 (<P) to source node S (<P). When the indications <P are encountered in node 3 and then in nodes 2 and S, nothing happens. When the indication P> is encountered in node 3, the detour via node 8 is deactivated and the resources recovered.

Deactivating the Unused Detours

De-activation of an unused detour is always initiated in a TD node. The worker signal on the detour is forced onto the worker path, then a DeleteDetour message is sent along the detour path from the TD node initiating detour deactivation and all the detour cross-connections are deleted. Information relating to the detour cross-connection in TD and ID nodes continues to be maintained, together with its associated path identifier, for further use in the event of future faults.

Figure 8:
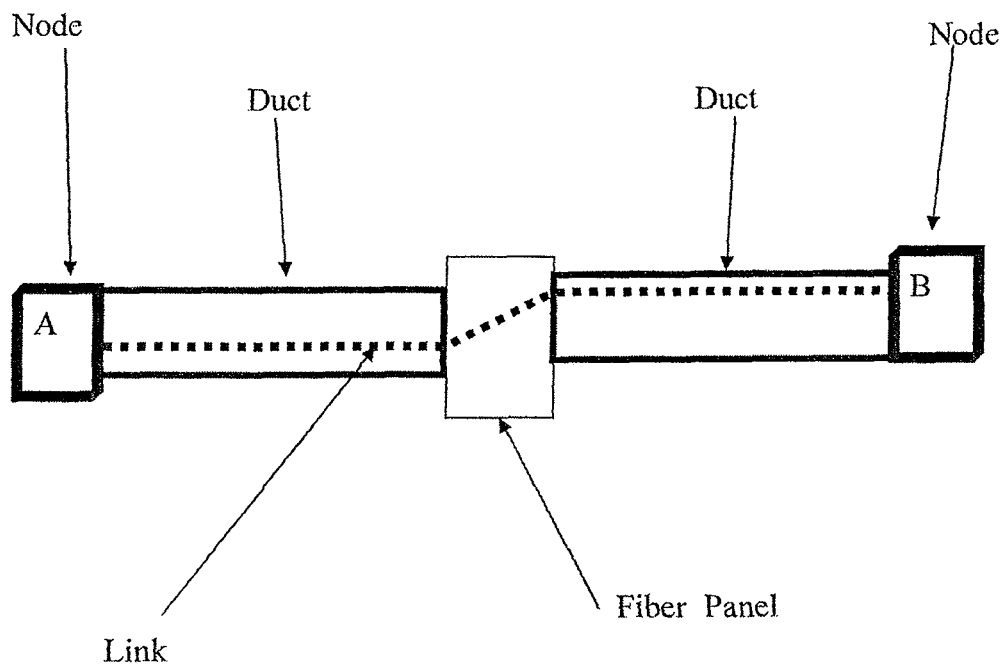
FIGS. 8 and 9 show various aspects of communications systems to which the present invention may be applied.
Figure 9:
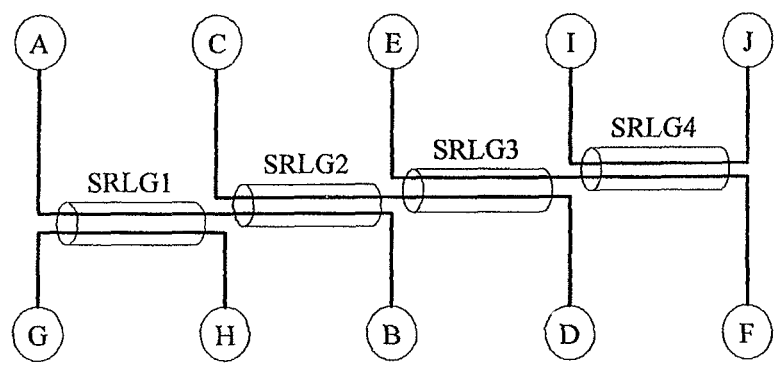

The process of selecting the protection path will now be described by way of example with reference to FIGS. 8 and 9 and using the following notation and definitions.

Notation:

∃: existential quantifier that reads "there exists".

{a, b, c} the set containing a, b and c;

∈ set membership;

⊆ subset;

∪ union;

∩ intersection;

¬ negation;

∅ empty set

DEFINITIONS

Let the network be described by a graph G={N, E, c}, where

N={ ... $n_b$ ... } is the set of nodes,

E⊆N×N is the set of links, where each link provides a connection between two nodes of the set N. It is the resource that gives bandwidth between two adjacent nodes and is identified by those two nodes;

c: E→ℜ is the cost function where ℜ: the field of the real numbers. The cost c is a function that maps links into real numbers; several cost values may be assigned to a link, all expressible with a real number, the main values include financial cost, total capacity, used capacity and remaining capacity; here we use also two auxiliary modified cost functions. In other cases to which the present invention has application (for example in all optical networks), you may need a very complex cost function expressing physical fiber parameters and optical signal quality. For the purposes of the present example embodiment, we assume a simple real cost.

$e_f$ is a faulty link;

$n_f$ is a faulty node

A path wp on the network is described by a sequence of nodes and their corresponding links wp=[$n_1$, $e_1$, $n_2$, $e_2$, ... $n_{k-1}$, $e_{k-1}$, $n_k$] provided link $e_i$ connects nodes $n_i$ and $n_{i+1}$, i.e. it satisfies the property $e_i=(n_i, n_{i+1})$. We will call $n_1$ the source of wp and $n_k$ its destination.

Given a path wp and a resource (link $e_f$ or node $n_f$) on the path that it is desired to protect with a protection path or detour, we define two more cost functions cl and cn as follows:

$$cl(wp, e_f, e_i) = \begin{cases} \infty & \text{if } f = i \\ 0 & \text{if } f \neq i \text{ and } e_i \in wp \\ c(e_i) & \text{otherwise} \end{cases}$$

The cost cl associated with each faulty link ($e_f$) is infinite (i.e. never use). The cost associated with a working link on the path (wp) is zero (i.e. always use). Otherwise, the cost is given by the function c.

$$cn(wp, n_f, e_i) = \begin{cases} \infty & \text{if } \exists n_i \text{ such that } e_i = (n_f, n_i) \text{ or } e_i = (n_i, n_f) \\ 0 & \text{if } (\neg \exists n_i \text{ such that } e_i = (n_f, n_i) \text{ or } e_i = (n_i, n_f)) \text{ and } e_i \in wp \\ c(e_i) & \text{otherwise} \end{cases}$$

The cost cn associated with each faulty node ($n_f$) is infinite (i.e. never use). The cost associated with a working node on the path (wp) is zero (i.e. always use). Otherwise, the cost is given by the function c. The cost function c is part of the definition of the input network and is taken as predetermined, e.g. on network initialization.

These two cost functions (cl, en) are used to find a minimum-cost detour protecting a potential faulty resource ($e_f$) or ($n_f$) of a path wp. Cost function cl allocates cost ∞ to link $e_f$ to prevent its use as a detour for itself. Cost function cl allocates cost 0 to links in wp that are already configured to ensure that these are always selected, where available. Cost function cn allocates costs relating to node $n_f$ in a similar way.

These cost functions operate to favour locality, i.e. resources closest to the resource to be protected. In this way the length of the detour, the amount of resources used and the time taken for implementing the detour are all minimized.

The concept of Shared Risk Link Group (SRLG) will now be discussed with reference to the drawings in which FIG. 1 shows a path passing through a number of resources. A SRLG indicates a pool of resources that share the same failure risk e.g. the fiber that share the same duct, links that share the same node will belong to the same SRLG.

A link can belong to more than one SRLG. In FIG. 1, for example, the two ducts define two SRLGs and the fiber panel defines another SRLG, thus the link from A to B belongs to three SRLGs.

The following naming conventions are used here.

A path between two points A and B will be indicated by AB.

A contiguous subset of resources in AB is called a segment of AB and is indicated with an index (e.g., $AB_1$, $AB_i$, $AB_k$).

If e is a link, we will write SRLG(e) for the set of SRLGs that e belongs to.

If path wp=[$n_1, e_1, n_2, e_2, \ldots n_{k-1}, e_{k-1}, n_k$], we will write SRLG(wp) for $\cup_i$ SRLG($e_i$).

A link interferes with another if the two links belong in the same SRLG.

If g is an SRLG and g∈SRLG(wp), its elements are links.

We will call closure of a path wp (more in general, closure of a link set) with respect to interference of the set of links IntClos(wp)=$\cup_i g_i$ for all $g_i$∈SRLG(wp)

FIG. 2 illustrates by way of example the concept of closure of a link set with respect to interference. With respect to FIG. 2 we can assert the following statements:
AB and CD belong to SRLG2;
SRLG(AB)={SRLG1, SRGL2};
SRLG({CD, EF})=SRLG(CD)∪SRLG(EF)={SRLG2, SRLG3, SRLG4};
AB interferes with GH and CD;
IntClos({CD, EF})={AB, CD, EF, IJ}.

When a path with protection is requested from A to B a working path AB and a set of protection detours $d_1(AB), \ldots d_k(AB)$ should be computed.

By definition, a detour $d_i(AB)$ protects a segment $AB_i$ of the working path.

The working path is typically computed by means of a shortest path algorithm. The protection detours should satisfy the following properties:

For each considered resource (link or node) supporting the working path, there should exist at least one detour restoring a fault on that resource: $\cup_i AB_i=AB$. This means that the combination of all detours will provide a complete alternative path between A and B. Advantageously, each detour should use as few resources as possible to allow maximum resource recovery. By setting cost to 0 for the already used resources and to ∞ for the faulty resource, the detour is encouraged to follow AB as closely as possible and to deviate only from the faulty resources. This is achieved by applying a minimal cost algorithm to these costs.

The allowed resources for detour implementation are:
the free (unused) resources
the resources already used for detours of other working paths, provided that the segments protected by the two detours have no common point of failure: that is, for $d_i(AB)$ some resources already used for $d_j(XY)$ if $AB_i$ and $XY_j$ have no common point of failure.

The algorithm guarantees the following:
SRLG(AB)∩SRLG($d_i(AB)$)=Ø, for each detour $d_i(AB)$ Otherwise, a single failure could affect working and protection simultaneously.

If SRLG($AB_i$)∩SRLG($XY_j$)≠Ø, $d_i(AB)$ and $d_j(XY)$ use disjoint resource sets and can therefore be implemented simultaneously.

This is necessary as, if SRLG($AB_i$)∩SRLG($XY_j$)≠Ø, there exist at least one resource whose failure would affect simultaneously the segments $AB_i$ and $XY_j$, thus, for effective restoration, it should be possible to allocate simultaneously $d_i(AB)$ and $d_j(XY)$.

Two routes or segments, detours or whatever set of resources are in link diversity if they are not supported by the same link or links, that is there is no single link fault that could simultaneously puts the two sets of resources out of order.

The investigation of resources for protection is done iterating on all links of a path, i.e. considering one link at a time and investigating how best to protect a fault on it.

INIT
Compute AB=[A=$n_1, e_1, n_2, e_2, \ldots n_{k-1}, e_{k-1}, B=n_k$] on the free resources in E using cost function c with the algorithm of choice
Initialize the detour set DS=Ø
Initialize the iterating faulty link fl=$e_1$
Set i=1
Set all resources used by some working path "busy" and all resource used by detours "free"
ITERATION
Compute AB' on the free resources in E using cost function cl(AB, fl); where AB' is another path from A to B that follows a different route from path AB.
Set $AB_i$=AB−(AB∩AB')
Set $d_i(AB)$=AB'−(AB∩AB')
Find IntClos($AB_i$)
Find all $d_j(XY)$ such that $XY_j$ uses some link in IntClos($AB_i$)
If there are free resources in $d_i(AB)$ not used by any $d_j(XY)$, then
Insert $d_i(dAB)$ in DS
If the B side of AB∩AB' includes only node B, terminate
Set fl to the first link on the B side of AB∩AB'
Set again all resources used by detours "free"
Increment i
Continue iteration
Else
Set resources used by any $d_j(XY)$ "busy" (temporarily for this iteration)
Continue iteration We now consider the algorithm for the protection path calculation with node diversity.

Two routes or segments, detours or whatever set of resources are in node diversity if they are not supported by the same node, that is there is no single node fault that could simultaneously put the two sets of resources out of order.
INIT
Compute AB=[A=$n_1$, $e_1$, $n_2$, $e_2$, ... $n_{k-1}$, $e_{k-1}$, B=$n_k$] on the free resources in E using cost function c with the algorithm of choice
Initialize the detour set DS=Ø
Initialize the iterating faulty node fn=$n_2$
Set i=1
Set all resources used by some working path "busy" and all resource used by detours "free"
ITERATION
Compute AB' on the free resources in E using cost function cn(AB, fn)
Set $AB_i$=AB−(AB∩AB')
Set $d_i$(AB)=AB'−(AB∩AB')
Find IntClos($AB_i$)
Find all $d_j$(XY) such that $XY_j$ uses some link in IntClos($AB_i$)
If there are free resources in $d_i$(AB) not used by any $d_j$(XY), then
Insert $d_i$(AB) in DS
Set fn to the first node on the B side of AB∩AB'
If fn=B, terminate
Set again all resources used by detours "free"
Increment i
Continue iteration
Else
Set resources used by any $d_j$(XY) "busy" (temporarily for this iteration)
Continue iteration The invention has been explained above by way of example mainly with reference to SDH Transport Networks due to the great popularity of this kind of network. However, it will be apparent to the skilled reader that the invention can be applied to all forms of transport network and to all topologies including, but not limited to, mesh and ring topologies.

The above-described embodiments are presented by way of example only and are not intended to limit the scope of the invention. The present invention advantageously provides a means and method for fast switching to a predetermined protection path and a routing algorithm, method and means suitable for computing the detours for a protection path in a shared local repair scheme as well as other forms of data communications systems. This algorithm takes into account interference of working paths to allow repair of multiple services against failure of multiple resources in shared risk group. It also considers maximization of locality to allow the use of the minimum amount of resources during a fault and to speed up detour activation.

The invention claimed is:

1. A method of protecting a path in a data communications system having a plurality of nodes and a plurality of links for providing connections between the nodes, comprising:
   passing a protected traffic through a subset of the links and the nodes making up a protected path;
   designating further subsets of the links and the nodes to form protection paths wherein the protection paths do not carry the protected traffic in the absence of a fault in the protected path;
   passing the protected traffic through at least one of the protection paths in the event of a fault in the protected path;
   deactivating at least one of the protection paths if said at least one of the protection paths is not used for protection of a faulty resource in the protected path; and
   reverting the protected traffic to the protected path when the protected path becomes available again.

2. The method according to claim 1, and identifying a location of the fault, and returning the protected traffic to those parts of the protected path not affected by the fault.

3. The method according to claim 2, and storing details of the protection path in the nodes of the further subset prior to detection of a fault in the protected path.

4. The method according to claim 2, and determining the at least one of the protection paths prior to detection of a fault in the protected path.

5. The method according to claim 1, and deactivating any of the links or the nodes of the protection paths that are not needed to provide a path for the protected traffic.

6. The method according to claim 1, and associating details of the at least one of the protection paths with a unique path identifier.

7. The method according to claim 1, and at least one of the nodes common to both of the protected path and at least one of the protection paths detecting a fault in the protected path, and activating the at least one of the protection paths by sending an activate message to the nodes of the at least one of the protection paths upon detection of the fault in the protected path.

8. The method according to claim 7, and the nodes sending the activate message to each adjacent node of the at least one of the protection paths.

9. The method according to claim 7, and including a unique path identifier in the activate message to inform the nodes of the at least one of the protection paths which connections to activate.

10. The method according to claim 1, and at least one node detecting a location of the fault in the protected path and, upon detection of the fault location, sending a deactivate message through the protected path in a direction away from the fault location.

11. The method according to claim 1, in which the nodes and the links used by the at least one of the protection paths carrying the protected traffic in the event of a fault in the protected path are disjoint from the nodes and the links used by the protected path.

12. The method according to claim 1, in which if the protected path belongs to a first Shared Risk Link Group, and if the at least one of the protection paths carrying the protected traffic in the event of a fault in the protected path belongs to a second Shared Risk Link Group, then an intersection of the first Shared Risk Link Group and the second Shared Risk Link Group is an empty set.

13. A network node for protecting a path in a data communications system, comprising:
   a plurality of ports for connecting to links for providing connections to other nodes,
   a first port being adapted to provide a protected path for passing a protected traffic, and
   a second port being adapted to provide protection paths adapted not to carry the protected traffic in the absence of a fault in the protected path and to provide an alternative path for the protected traffic in the event of a fault in the protected path,
   the network node being adapted to deactivate at least one of the protection paths, while the protected path is not available, if said at least one of the protection paths is not used for protection of a faulty resource in the protected path, whereas if said at least one of the protection paths is used for protection of a faulty resource in the worker path, then the network node is adapted to revert the protected traffic from the protection path to the protected path when the protected path becomes available again.

14. The network node according to claim 13, and a diagnostic module adapted to identify a location of the fault, and the node being adapted to deactivate unused parts of the protection path and to return the protected traffic to those parts of the protected path not affected by the fault.

15. The network node according to claim 13, in which, if the node is common to both the protected path and the protection path the node is adapted to detect a fault in the protected path and to activate the protection path by sending an activate message to the nodes of the protection path upon detection of the fault in the protected path.

16. The network node according to claim 13, in which if the node detects a location of the fault in the protected path, then the node is adapted to, upon detection of the fault location, send a deactivate message through the protected path in a direction away from the fault.

* * * * *

UNITED STATES PATENT AND TRADEMARK OFFICE
CERTIFICATE OF CORRECTION

PATENT NO. : 9,565,055 B2  
APPLICATION NO. : 14/506869  
DATED : February 7, 2017  
INVENTOR(S) : Caviglia et al.

Page 1 of 1

It is certified that error appears in the above-identified patent and that said Letters Patent is hereby corrected as shown below:

In the Specification

In Column 1, Line 9, delete "now allowed," and insert -- now Pat. No. 8,886,832, --, therefor.

In Column 2, Line 11, delete "path" and insert -- path. --, therefor.

In Column 3, Line 29, delete "0.805" and insert -- G.805 --, therefor.

In Column 3, Line 46, delete "FIG.2," and insert -- FIG.2 --, therefor.

In Column 5, Line 48, delete "points" and insert -- points. --, therefor.

In Column 5, Line 62, delete "monitoring" and insert -- monitoring. --, therefor.

In Column 6, Line 32, delete "faulty, resource" and insert -- faulty resource --, therefor.

In Column 9, Line 45, delete "$g_i \epsilon SRLG(wp)$" and insert -- $g_i \epsilon SRLG(wp)$. --, therefor.

In the Claims

In Column 13, Line 11, in Claim 15, delete "path" and insert -- path, --, therefor.

In Column 13, Line 15, in Claim 16, delete "which" and insert -- which, --, therefor.

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*